United States Patent [19]

Yoshino et al.

[11] Patent Number: 4,706,195
[45] Date of Patent: Nov. 10, 1987

[54] SPEED CONTROL SYSTEM FOR A MOTOR VEHICLE

[75] Inventors: Yasuhisa Yoshino, Okazaki; Yoshiyuki Kago, Nishio; Hiroyuki Sakakibara, Hekinan; Yoshio Shinoda, Nukata, all of Japan

[73] Assignees: Nippon Soken, Inc., Nishio; Nippondenso Co., Ltd., Kariya, both of Japan

[21] Appl. No.: 744,058

[22] Filed: Jun. 12, 1985

[30] Foreign Application Priority Data

Jun. 15, 1984 [JP] Japan .................................. 59-123951

[51] Int. Cl.$^4$ .............................................. G06F 15/50
[52] U.S. Cl. .................... 364/426; 180/169; 180/170; 364/461; 340/903
[58] Field of Search ............... 364/424, 426, 460, 461, 364/456; 340/901-904; 180/167, 169, 170, 179; 342/70, 455

[56] References Cited

U.S. PATENT DOCUMENTS

| | | | |
|---|---|---|---|
| 3,921,749 | 11/1975 | Kawada | 340/904 |
| 4,491,840 | 1/1985 | Nishikawa et al. | 364/426 |
| 4,519,469 | 5/1985 | Hayashi et al. | 340/903 |
| 4,621,705 | 11/1986 | Etoh | 364/456 |
| 4,622,636 | 11/1986 | Tachibana | 364/424 |

OTHER PUBLICATIONS

"Radar Control for Automotive Collision Mitigation and Headway Spacing" by Belohoubek, IEEE Transactions on Vehicular Technology, vol. VT-31, No. 2 May 1982, pp. 89-99.

*Primary Examiner*—Gary Chin
*Attorney, Agent, or Firm*—Cushman, Darby & Cushman

[57] ABSTRACT

A speed control system for a motor vehicle automatically controls a throttle valve so as to allow the vehicle to run at a desired velocity at all times. The system includes a laser radar for detecting a preceding vehicle and measuring the distance therefrom, and a control computer in which a proper distance responsive to a vehicle velocity is set. The control computer discriminates proximity to the preceding vehicle through change in the distance at a certain interval. When the distance exceeds the proper distance, the control computer reduces the desired velocity in case proximity to the preceding vehicle is discriminated at a plurality of times continuously and increases the desired velocity in case no such proximity is discriminated, and when the distance is below the proper distance, the computer decelerates the vehicle by directly controlling the throttle valve in the closing direction, allowing tracing running with the proper distance from the preceding vehicle.

11 Claims, 12 Drawing Figures

SPEED CONTROL SYSTEM FOR A MOTOR VEHICLE

BACKGROUND OF THE INVENTION

1. Field of the Invention

The present invention relates to a speed control system for a motor vehicle which serves to automatically change the running speed in accordance with the running conditions.

2. Description of the Prior Art

In a prior art speed control system, the velocity of the vehicle is detected to control running equipment such as a throttle valve in such a way that the velocity will reach a certain desired velocity. Such a speed control system is effective when the vehicle is running at a constant speed for a relatively long period of time, for example, on an expressway.

However, when any such speed-controlled vehicle is following another vehicle running at a relatively low speed in front of the vehicle, or when another vehicle cuts in relatively close in front of the speed-controlled vehicle, the constant running must be interrupted. Whenever such a case occurs, automatic running controlled by the speed control system must be cancelled and changed to ordinary hand operated running. Thus, the prior art speed control system has presented a problem, in that operation thereof includes troublesome steps of cancelling and resuming operation thereof.

SUMMARY OF THE INVENTION

Accordingly, it is an object of the present invention to provide a speed control system for a motor vehicle which serves, when there is no preceding vehicle, to keep the vehicle running at a predetermined constant speed, and when there is any preceding vehicle, to control the speed so as to keep a proper distance apart from the preceding vehicle.

The speed control system for a motor vehicle according to the present invention comprises;

(1) means for setting a desired velocity to a predetermined value unconditionally, (2) running control means for automatically controlling running equipment so that the velocity of the vehicle will reach the dsired velocity, (3) means for setting a proper distance apart from a preceding vehicle in response to the velocity, (4) means for measuring a distance apart from the preceding vehicle, (5) means for detecting proximity with respect to the preceding vehicle through change in the measured distance at a certain time interval, and (6) distance control means for keeping the proper distance apart from the preceding vehicle which, when the measured distance exceeds the proper distance, reduces the desired velocity in case proximity to the preceding vehicle is detected at a plurality of times continuously, and increases the desired velocity in case no such proximity is detected, and which, when the measured distance is below the proper distance, reduces the velocity by controlling the running equipments preceeding to the running control means and sets the reduced velocity as the desired velocity.

The speed control system thus constructed is effective to allow a vehicle to run constantly at a predetermined desired velocity and when any preceding vehicle is detected, to change the desired velocity in such a way as to allow the vehicle to trace the preceding vehicle with a proper distance apart from it. Consequently, it is unnecessary to cancel automatic running which has been required in the prior art, whenever any vehicle cuts in your course or your vehicle is closing to a preceding vehicle running at a low speed.

Furthermore, when the measured distance apart from the preceding vehicle becomes below the proper distance, the control system directly controls running equipment such as a throttle valve, allowing prompt deceleration of the vehicle.

The present invention will become more fully apparent from the claims and description as it proceeds in connection with the drawings.

DETAILED DESCRIPTION OF THE PREFERRED EMBODIMENT

Figure 1:
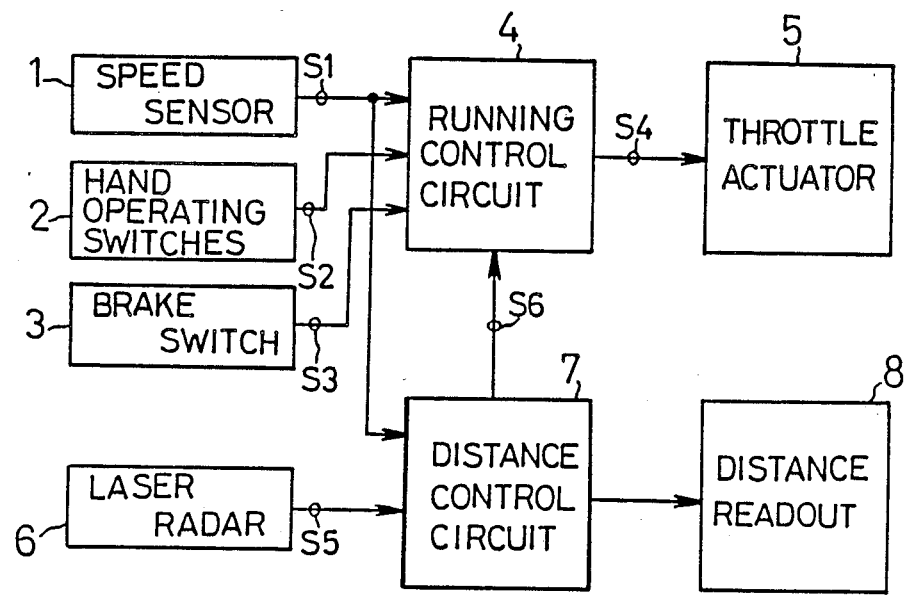
FIG. 1 is a whole block diagram of a speed control system according to the present invention.

FIG. 1 shows a schematic block diagram of a speed control system for a motor vehicle according to the present invention. This includes a speed sensor 1 which is connected to a cable of a speed meter and generates a pulse signal responsive to the velocity, a group of hand operating switches 2 including a switch for setting a desired velocity, a brake switch 3 which is actuated at the operation of a brake, a running control circuit 4, a throttle actuator 5 for increasing and decreasing the velocity through the control of a throttle valve, a laser radar 6 for measuring the distance apart from a preceding vehicle, a distance control circuit 7 and a distance readout 8.

Figure 2:
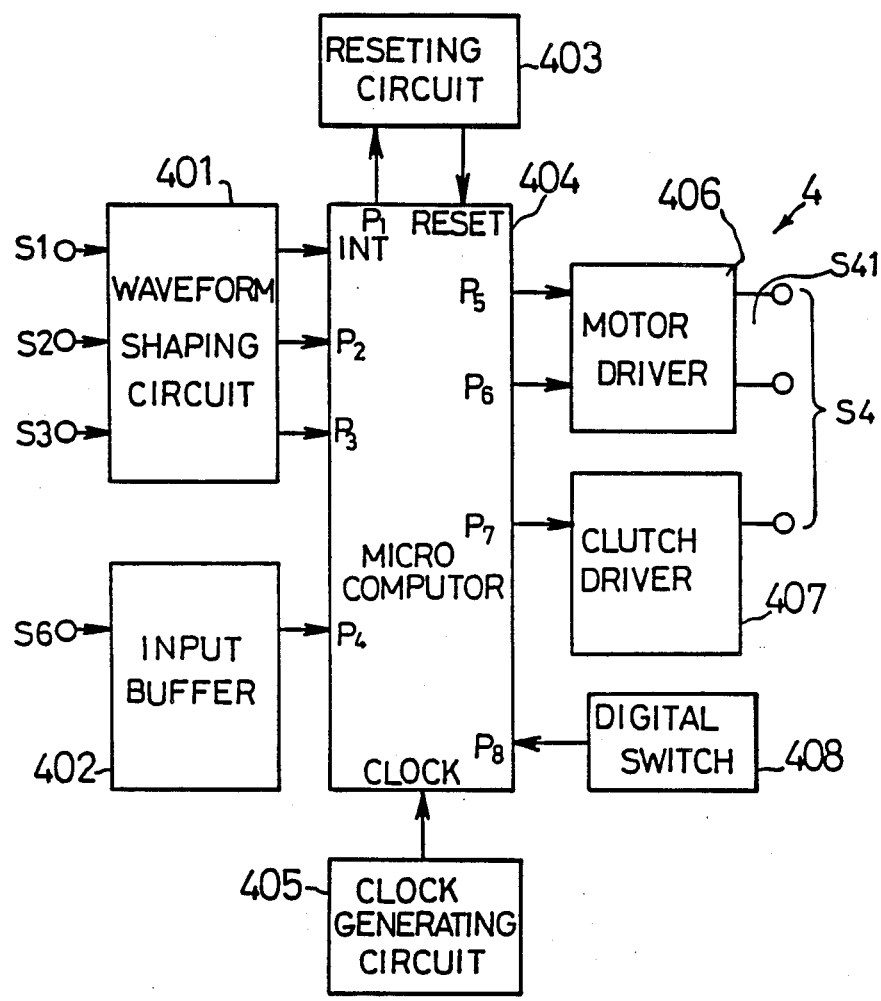
FIG. 2 is a block diagram of a running control circuit.

FIG. 2 shows the construction of the running control circuit 4 which includes a waveform shaping circuit 401, an input buffer 402, a reset circuit 403, a microcomputer 404, a clock generating circuit 405, a motor driver 406, a clutch driver 407 and a digital switch 408 for setting, for example, a gain of the motor driver 406, Signals S1, S2 and S3 from the speed sensor 1, the group of switches 2 and the brake switch 3 are fed through the waveform shaping circuit 401 to an external interruption terminal INT and input ports P2 and P3 of the computer 404, respectively. A control signal S6 from the distance control circuit 7 (See FIG. 1) is fed through the input buffer 402 to an input port P4 of the computer 404.

The reset circuit 403 incorporates a watch dog timer and generates a reset pulse to the computer 404 to reset computer 404 when a power supply is on and when the program runs out of control. The motor driver 406 amplifies the power of a motor forwarding/reversing signal transmitted from output ports P5 and P6 to drive a motor for opening and closing the throttle valve incorporated in the actuator 5 (See FIG. 1). The clutch driver 407 is operated in response to a clutch connection signal transmitted from an output port P7 to actuate an electromagnetic clutch adapted for connecting the throttle valve and the motor for opening and closing it. When the electromagnetic clutch is off, the throttle valve is opened and closed under control of an accelerator pedal.

Figure 3:
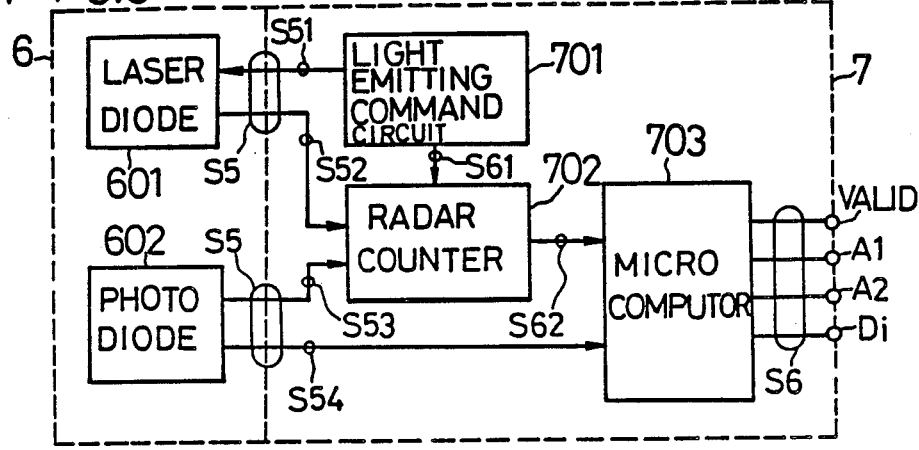
FIG. 3 is a block diagram of a distance control circuit.

FIG. 3 shows the construction of the laser radar 6 and distance control circuit 7.

The laser radar 6 is composed of a near-infrared semiconductor laser diode 601 and a PIN photodiode 602. The distance control circuit 7 is composed of a light emitting command circuit 701, a radar counter 702 and a microcomputer 703.

When the light emitting command circuit 701 transmits an initializing signal S61 to the counter 702, the counter 702 is placed into a COUNT READY state, and when a light emitting command signal S51 is fed to the laser diode 601, the laser diode emits light. Because a relatively long time period must elapse before the light becomes stable, a counting operation of the counter 702 is started by light validating signal S52. A laser beam applied against an object and reflected thereby is received by the photodiode 602, and a light receiving signal S53 is fed to the counter 702. The time between generation of the light validating signal S52 and generation of the light receiving signal S53 corresponds to the time required for the light to go to the object and return from the object. S54 designates an effective signal which determines if the light receiving signal is stable and effective, and is fed to the comnputer 703.

The computer 703 transmits a distance Di, alarm signals A1 and A2 which will be mentioned later, and a data validating signal VALID as control signals S6 to the running control circuit 4. The distance data Di is also fed to the distance readout 8(See FIG. 1).

Figure 9:
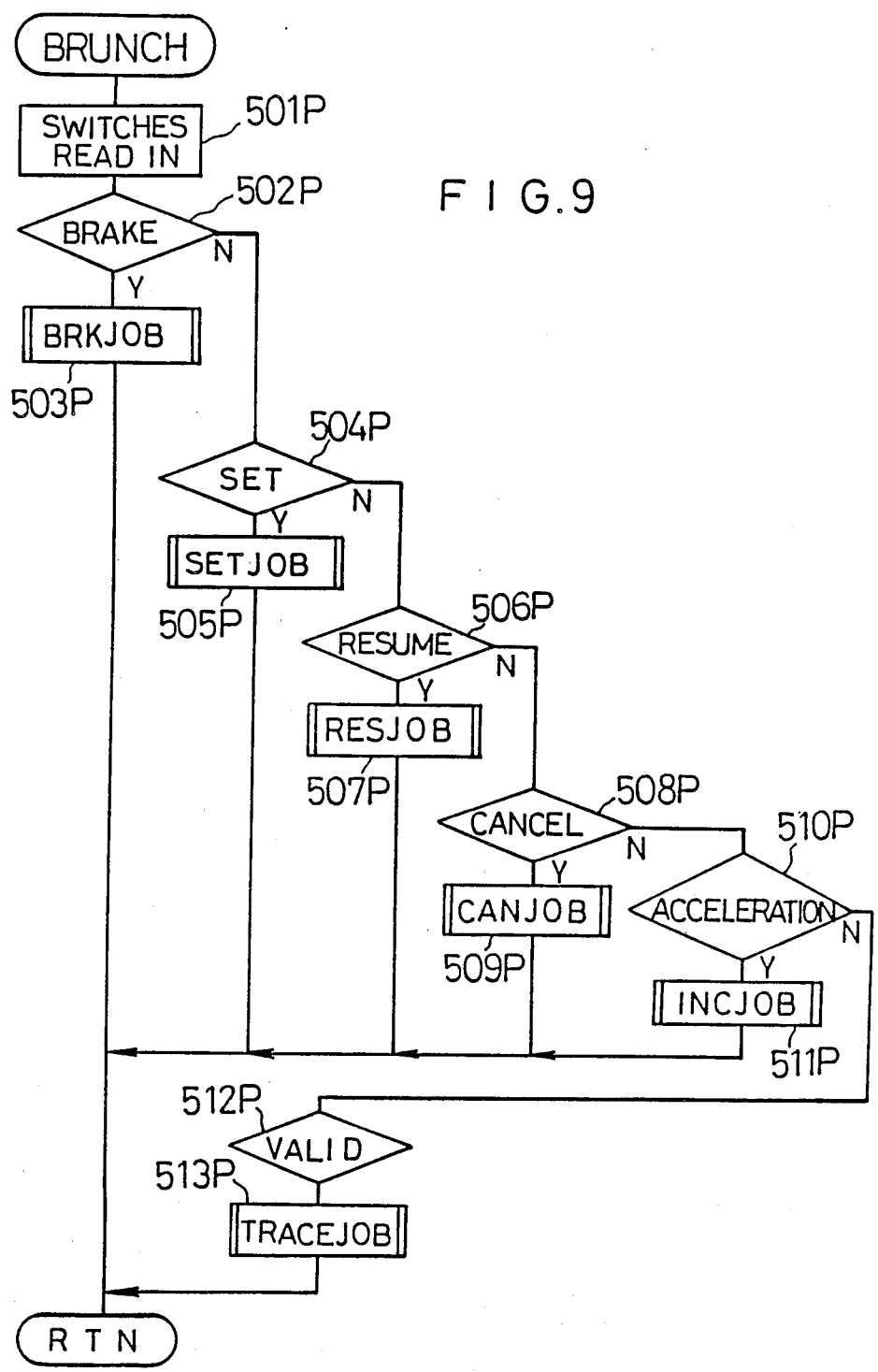
Figure 10:
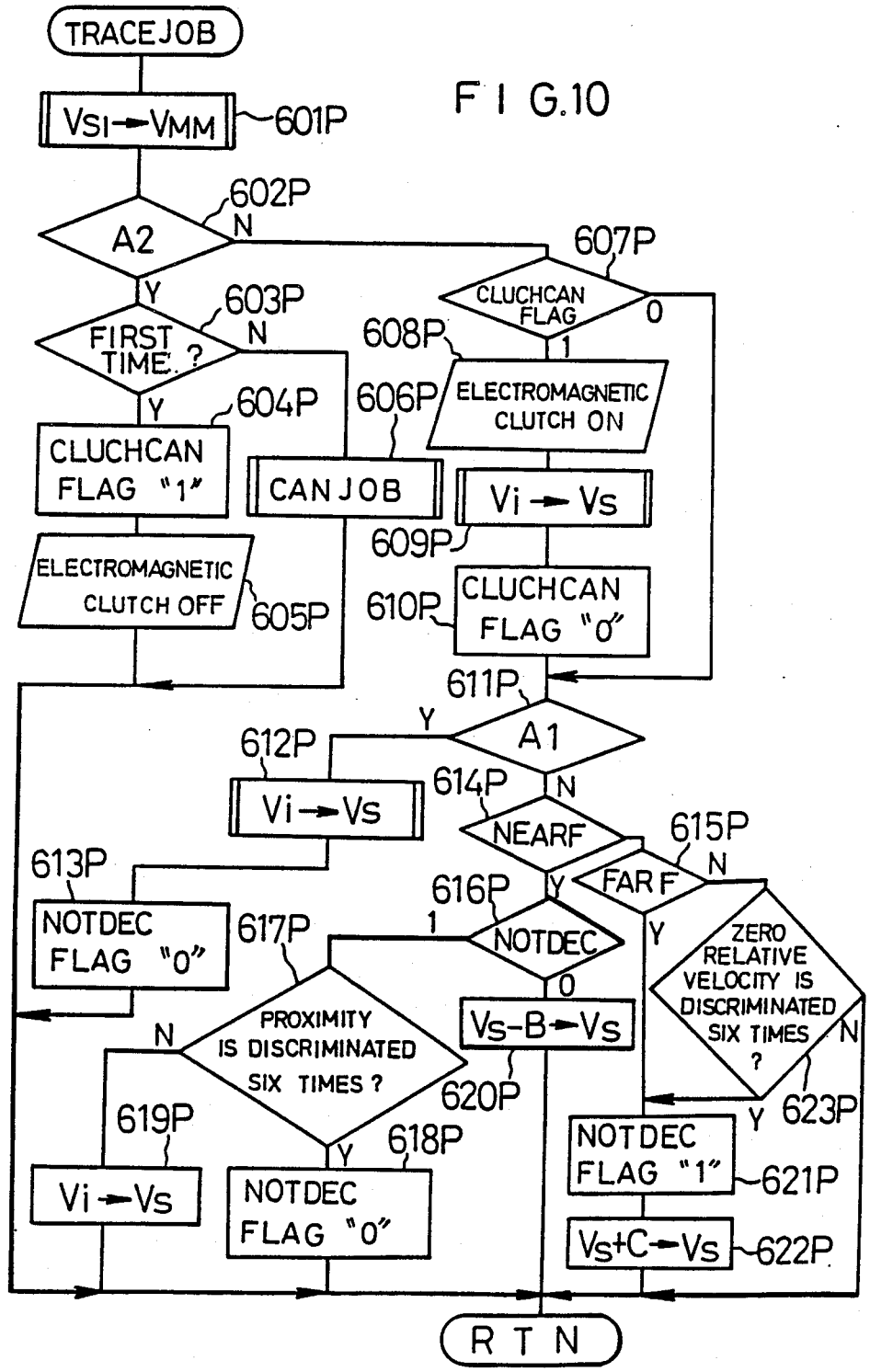
Figure 11:
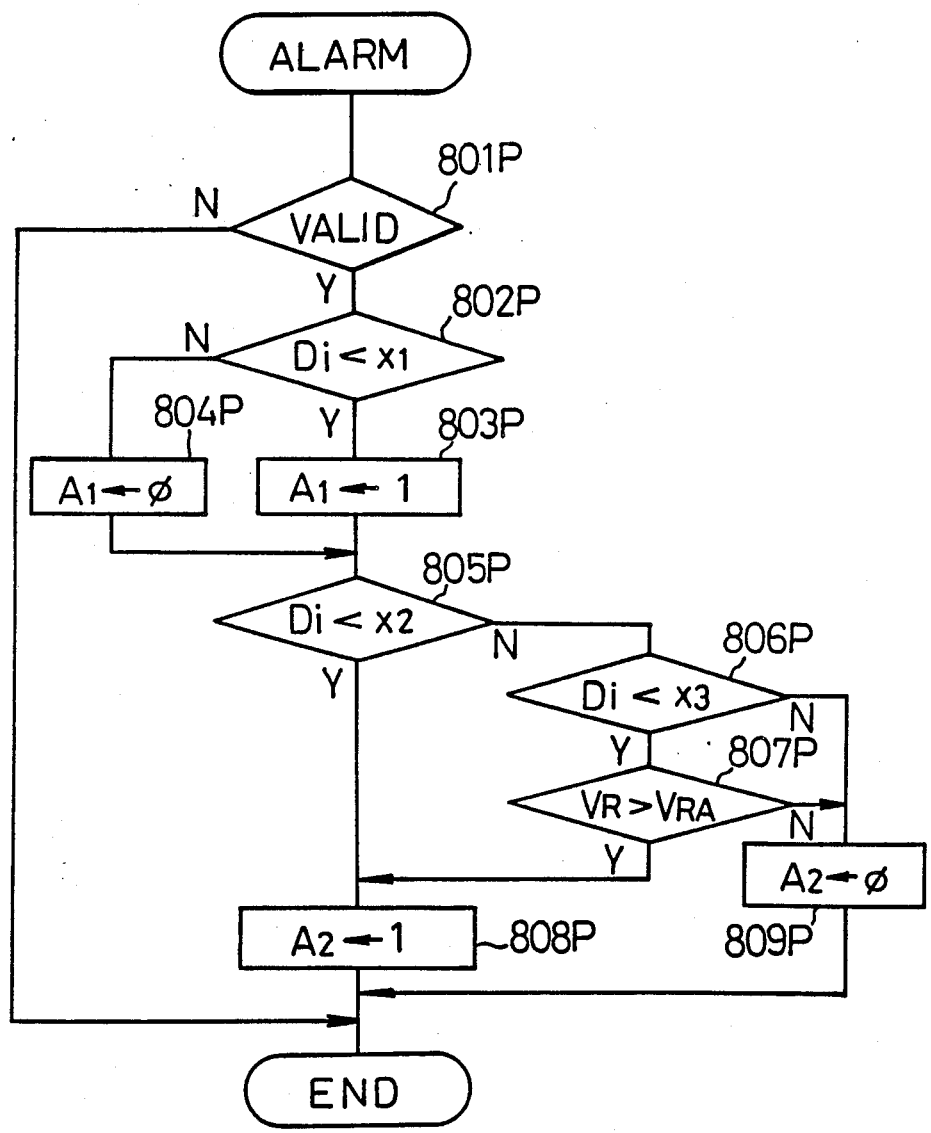

Now, the operation of the speed control system will be described, referring to the program flow charts of the computers 404 and 703. FIGS. 4 to 10 illustrate the program to be executed by the computer 404 and FIG. 11 illustrates the program to be executed by the computer 703.

Figure 4:
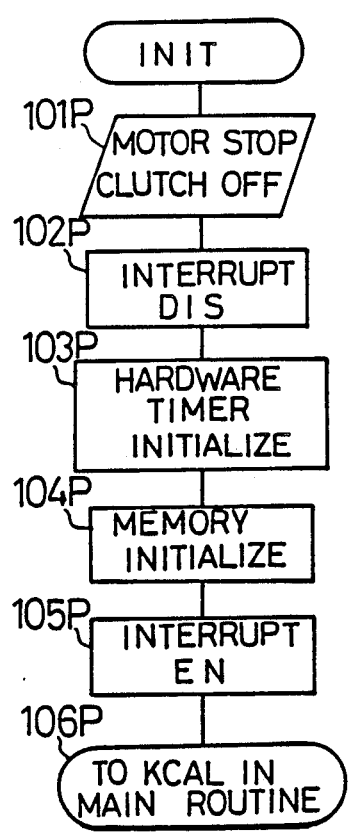
FIGS. 4 to 11 are flow charts illustrating the operation of the speed control system.
Figure 5:
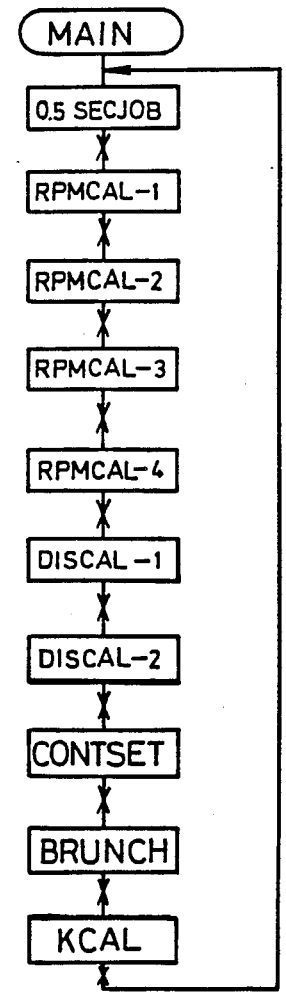

FIG. 4 shows an initial routine to be executed when power is applied, in which outputs from the motor driver 406 and the clutch driver 407 are stopped at the step 101P. Sequentially, interrupt is disabled (step 102P), a hardware timer for interrupt and memory are initialized (steps 103P and 104P), and then interrupt is enabled (step 105P). Now, a jump takes place to KCAL routine in a main routine.

The main routine includse 0.5 SECJOB, RPMCAL, DISCAL, CONISET, BRUNCH and KCAL routines. RPMCAL routine is divided into four, and DISCAL routine is divided into two, so that every routine is set to be terminated within 0.4 m sec. As shown by the symbol* in the drawing, when any of the routines is terminated, a pulse is transmitted to the watch dog timer incorporated in the reset circuit 403.

Figure 8:
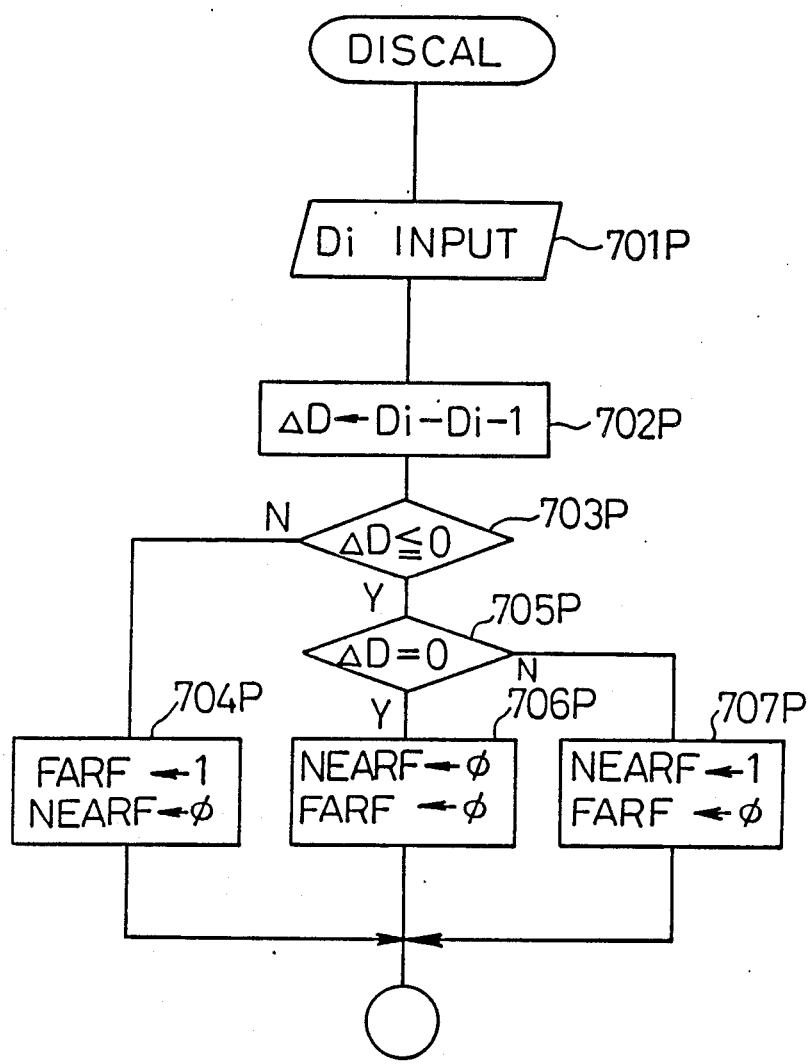

0.5 SECJOB routine detects overflow of a software timer which will be mentioned later, and sets a flag every 0.5 sec. The routines subsequent to this routine are to be executed only when the flag is set. RPMCAL routine calculates the difference $\Delta V$ between a velocity Vi obtained in T-OVER routine which will be mentioned later and a desired velocity Vs and also a vehicle acceleration $\alpha$. As shown in FIG. 8, DISCAL routine receives as an input a distance Di from the distance control circuit 7 and calculates the difference $\Delta D$ between the distance Di and the distance Di-1 at the preceding cycle or 0.5 sec. before (steps 701P and 702P), and according to the result, it sets NEARF flag indicating proximity to a preceding vehicle or FARF flag indicating far distance from the preceding vehicle (steps 703P through 707P).

In CONTSET routine, a driving signal S41 for the motor for opening and closing the throttle valve in the actuator 5 is produced according to the equation:

$$S41 = K(A \cdot \alpha + \Delta V)$$

where
K and A are constantly,
$\Delta V$ is difference in velocity, and
$\alpha$ is acceleration.

As described above, x is fed to the motor driver 406. The opening and closing motor is operated in a forward or reverse operation for a period proportional to the absolute value of the signal S41, so that the instant velocity Vi will get nearer to the desired velocity Vs.

The constant K is set by the digital switch and entered in KCAL routine. The details as to BRUNCH routine are shown in FIGS. 9 and 10 which will be discussed for better understanding later.

Figure 6:
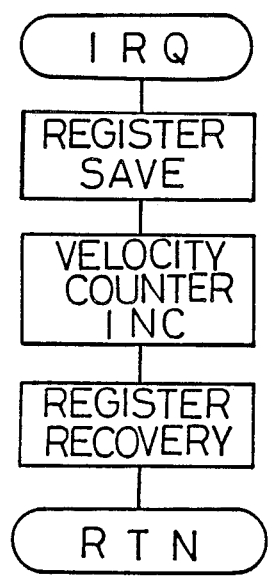
Figure 7:
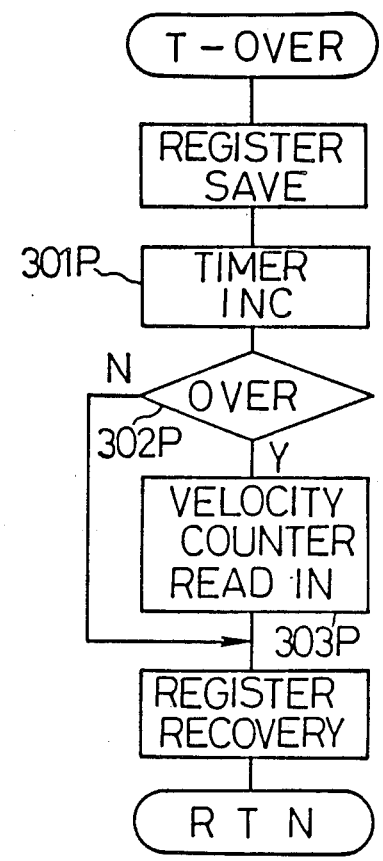

IRQ and T-OVER routines shown in FIGS. 6 and 7, respectively, are started by interrupt during the execution of the main routine. More specifically, the IRQ routine is started whenever the pulse signal S1 from the speed sensor 1 is output, and increments the velocity counter. T-OVER routine is started by the hardware timer at certain intervals to increment the software timer (step 301P), and at the overflow of this timer or every 0.5 sec. reads in the count of the velocity counter to obtain the instant velocity Vi (steps 302P and 303P).

As mentioned above, the distance control circuit 7 transmits the instant distance Di, data validating signal VALID and alarm signals A1 and A2. When the level of the signal VALID rises to 1, the running control circuit 4 stops the constant running operation, and starts a control operation for tracing a preceding vehicle (which will be mentioned later). The running control circuit 4 also modifies control apparatus during the tracing control (which will be mentioned later) in reference to the signals A1 and A2.

The level of the data validating signal VALID is set to rise to 1 upon detecting an object within the maximum measurable range of the laser radar 6(within about 100 m in this embodiment). From a practical point of view, the velocity range will be between 30 to 90 km/h (the area enclosed by the broken lines in FIG. 12). From the experiments by the inventors, no instant distance Di is transmitted within the distance below the line al in FIG. 12, to prevent a preceding motorcycle temporarily coming in and out of a vehicle's course, from being mistaken for an object to be traced. Also, no signal is transmitted within the distance below the line a2 in FIG. 12 to avoid an incorrect detection caused by exhaust gas and rain. In this embodiment, if the receiving strength of the radar 6 frequently drops below a predetermined value even within the maximum measurable range of the radar 6, the level of the signal VALID falls to 0.

In this embodiment, al(m)=0.5 Vi (m/s) and a2 is 5 (m).

In this embodiment, when the distance apart from a preceding vehicle is more than 60 m (line a3 in FIG. 12) and the relative velocity VR with respect to the preceding vehicle calculated from the instant distance Di is substantially equal to the instant velocity Vi, a condition is established which indicates the preceding vehicle as stopping. The level of the signal VALID falls to 0 and no tracing control is carried out.

Figure 12:
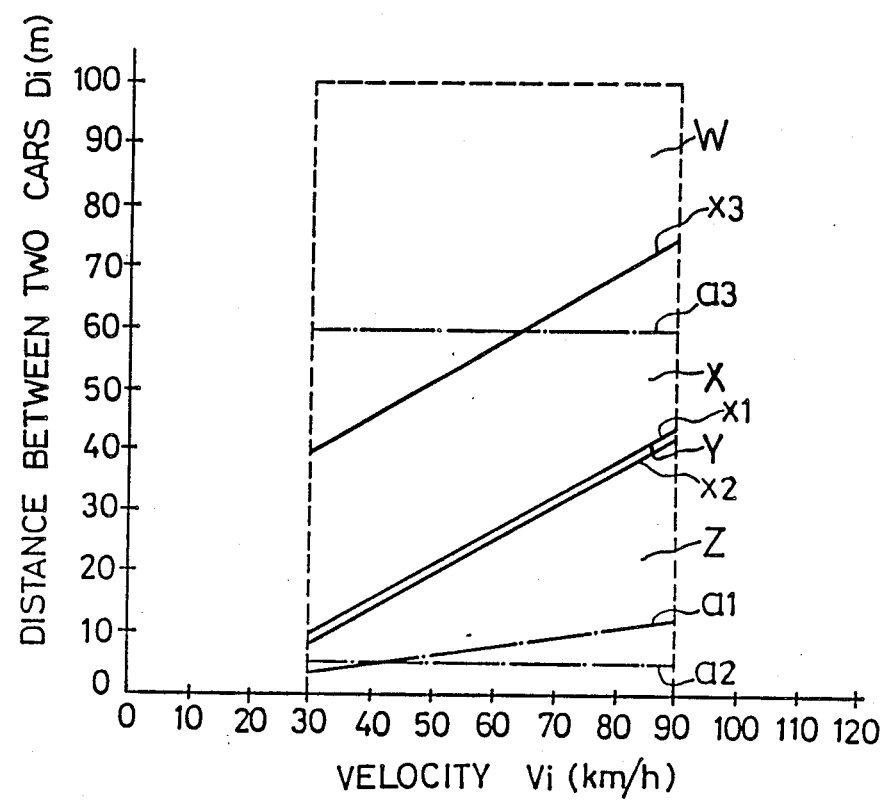
FIG. 12 shows an area in which tracing to a preceding vehicle is controlled.

As shown in FIG. 12, the area in which the level of the data validating signal VALID is 1 is divided by a desired line x1 which indicates the proper distance at a velocity Vi, a proximate line x2 and an alarm line x3 into areas W, X, Y and Z, in which the control circuit 7 varies the level of the alarm signals A1 and A2, as is shown in FIG. 11.

In this embodiment, the lines x1, x2 and x3 are set as follows:

$$x1(m) = 2 \cdot Vi(m/s) - 6$$

$$x2(m) = 2 \cdot Vi(m/s) - 7$$

$$x3(m) = 2 \cdot Vi(m/s) + 24$$

FIG. 11 shows ALARM routine in which, when the level of the signal VALID is 1 and the instant distance Di exceeds the line x1 (i.e. in the areas W and X), the level of the signal A1 falls to 0 (steps 801P, 802P and 804P). In the other cases (i.e. in the areas Y and Z) the level of the VALID signal rises to 1 (step 803P). When the distance is below the line x2 (i.e. in the area of Z), and when the distance Di is above the line x2 but below the line x3 (i.e. in the areas X and Y) and the relative velocity VR exceeds a predetermined value VRA (4.5 m/s in this embodiment) indicating a direction closing to the preceding vehicle, the level of the signal A2 rises to 1 (steps 805P, 806P, 807P and 808P). In the other cases, its level falls to 0 (step 809P).

In BRUNCH routine (See FIG. 9) executed in the running control circuit 4, the signals S2 and S3 from the group of switches 2 and the brake switch 3 are read in (step 501P). The group of the switches 2 are composed of SET, RESUME, CANCEL and ACCELERATION switches. When the brake switch 3 turns on, operation of the speed control system is cancelled immediately (steps 502P and 503P). The switches 2 are actuated to allow SETJOB, RESJOB, CANJOB and INCJOB routines to be executed, and in the respective routines the instant velocity Vi is set as the desired velocity Vs (steps 504P and 505P), the velocity stored just before cancellation of the system is resumed as the desired velocity Vs (steps 506P and 507P), the system is cancelled (steps 508P and 509P) and the desired velocity Vs is increased (steps 510P and 511P).

When the distance apart from a preceding vehicle comes into the maximum measurable range of the lasaer radar 6, the level of the data validating signal VALID from the distance control circuit 7 rises to 1, causing the TRACEJOB routine for tracing the preceding vehicle, which will be mentioned later, to be executed (steps 512P and 513P). When the level of the signal VALID is 0, processing returns to MAIN routine, causing constant running at the desired velocity Vs.

Now, the TRACEJOB routine in FIG. 10 will be described in reference to FIG. 12.

At the step 601P, the desired velocity Vs1, just before execution progresses to this routine, is saved in memory VMM, so as to allow the constant running to be restarted at the former desired velocity Vs1, after the tracing running is terminated. When the running condition of the vehicle is within the areas W and X, the level of both the alarm signals A1 and A2 is 0, and the level of CLUCHCAN flag which will be mentioned later is 0, allowing execution to progress to the steps 602P→607P→611P→614P in sequence. At the steps 614P and 615P, whether the vehicle is near or far apart from the preceding vehicle is discriminated, referring to NEARF and FARF flags set in DISCAL routine (See FIG. 8).

When the vehicle is coming nearer to the preceding vehicle, the level of NOTDEC flag, which will mentioned later is 1, in the areas W and X, allowing execution to progress to the steps 614P→616P→617P in sequence. At the step 617P, whether the processing has executed the steps 614P, 616P and 617P six times continuously is discriminated. If it is discriminated yes, execution progresses to the step 618P to set the level of NOTDEC flag to 0. If it is discriminated no, the instant velocity Vi is set at the desired velocity Vs at the step 619P. If the level of NOTDEC flag is 0 at the step 616P, the desired velocity Vs is reduced by a certain amount B at the step 620P.

When the vehicle is becoming farther apart from the preceding vehicle, the level of NOTDEC flag is set to 1 at the step 621P, and the desired velocity Vs is increased by a certain amount C at the step 622P.

If the state in which there is no change in the distance from the preceding vehicle or the relative velocity VR with respect to the preceding vehicle is 0 is discriminated six times continuously (step 623P), execution progresses to the steps 621P and 622P to increase the desired velocity Vs. The maximum of the desired velocity Vs is set to the desired velocity Vs1 saved in the memory VMM at the step 601P.

The execution of the steps 614P to 623P is repeated until the velocity Vi is reduced to around the velocity of the preceding vehicle, and the running condition of the vehicle gets in the area Y.

In the area Y, the level of the signal A1 rises to 1. In this case, execution progresses to the steps 611P→612P→613P in sequence, and the instant velocity Vi is set as the desired velocity Vs (step 613P). In other words, in the area Y7, the desired velocity Vs suffers no change but remains constant.

When the running condition of the vehicle gets into the area Z for the first time, the level of the signal A2 rises to 1, allowing the execution to progress to the steps 602P→603P→604P→605P in sequence, and the level of CLUCHCAN flag rises to 1 (step 604P). The electromagnetic clutch, interposed between the throttle valve and the motor for opening and closing the throttle valve is then turned off (step 605P). As the result, the throttle valve is fully closed immediately to place the engine brake into operation, allowing the speed of the vehicle to be rapidly reduced until the running condition leaves the area Z. When it gets out of the area Z, execution progresses to the steps 602P→607P→608P→609P→610P in sequence, and the electromagnetic clutch is turned on again (step 608P). The instant velocity Vi is set as the desired velocity Vs (step 609P) and the level of CLUCHCAN flag falls to 0 (step 610P). Following the step 610P, the steps 611P to 623P are executed.

In case the running condition of the vehicle gets into the area Z more than twice, te CANJOB routine at the step 606P is executed. In this routine, without the electromagnetic clutch off, the opening and closing motor is reversed to gradually close the throttle valve for relatively slow deceleration.

When the vehicle is rapidly coming nearer to the preceding vehicle in the area X and Y, the level of the signal A2 rises to 1, as mentioned above, allowing execution to progress to the steps 603P to 606P for rapid or slow deceleration.

The speed control system thus constructed is effective to allow a vehicle to run constantly at a predetermined desired velocity and when any preceding vehicle is detected, to change the desired velocity in such a way as to allow the vehicle to trace the preceding vehicle with a proper distance apart from it. Consequently, it becomes no longer necessary to cancel automatic running, as has been required in the prior art, whenever any vehicle cuts in the course of a speed-controlled vehicle, or the speed-controlled vehicle is closing to a preceding vehicle running at a low speed.

Furthermore, when the distance apart from the preceding vehicle becomes below the proper distance, the control system directly control running equipment such as a throttle valve, allowing prompt deceleration of the vehicle.

In this embodiment, when the instant distance apart from a preceding vehicle exceeds the proper distance, but the speed-controlled vehicle is rapidly closing to the preceding vehicle, the running equipment is controlled to perform prompt deceleration so as to prevent the distance from dropping drastically below the proper distance.

Furthermore in this embodiment, any distance data below a certain value is disregarded, so as to prevent the system from any possible wrong operation caused by a motorcycle temporarily coming in and out of the speed-controlled vehicle's course, rain or others.

While the invention has been described with reference to a preferred embodiment thereof, it is to be understood that modifications or variations may be easily made without departing from the scope of the present invention which is defined by the appended claims.

What is claimed is:

1. A speed control system for a motor vehicle comprising:
    means for determining a velocity of said motor vehicle;
    running control means for automatically controlling running equipment of said motor vehicle to maintain said velocity of said motor vehicle at a desired velocity;
    means for determining a proper distance apart from any preceding vehicle in response to said velocity of said motor vehicle, and for determining a proximate distance, shorter than said proper distance;
    means for detecting if a preceding vehicle is present and measuring a distance apart from the preceding vehicle if one is detected;
    means for detecting at a certain time interval, a proximity with respect to the preceding vehicle by a change in said measured distance, said measured distance decreasing greater than a predetermined rate to indicate said proximity; and
    distance control means for maintaining said proper distance apart from the preceding vehicle by: (1) when said meaured distance is above said proper distance, and said proximity to the preceding vehicle is continuously detected for a plurality of time intervals, temporarily reducing said desired velocity to a reduced desired velocity and increasing the desired velocity after a time of no such proximity being detected, (2) when the measured distance is between the proper distance and the proximate distance, maintaining the desired velocity constant with no change at its present value, and (3) when the measured distance is below the proximate distance, rapidly decelerating the vehicle.

2. The speed control system as defined in claim 1 wherein said means for setting a proper distance sets the proper distance x1(m) to the value determined by the equation:

$$x1(m) = 2 \cdot Vi(m/s) - 6$$

where Vi(m/s) is the velocity.

3. The speed control system as defined in claim 1 wherein said means for measuring a distance is a laser radar.

4. The speed control system as defined in claim 1, wherein said means for setting a proximate distance sets the proximate distance x2(m) to the value determined by the equation:

$$x2(m) = 2 \cdot Vi(m/s) - 7$$

where Vi(m/s) is the velocity.

5. A speed control system as in claim 1 wherein said running control means includes a motor for opening and closing a throttle valve of an engine, and an electromagnetic clutch adapted for connecting said motor to said throttle valve, said distance control means decelerating said vehicle rapidly when the measured distance is below the proximate distance by closing said throttle valve using said electromagnetic clutch.

6. The speed control system as defined in claim 5 wherein said distance control means includes means for setting an alarm distance longer than the proper distance, and when the distance is between the proper distance and the alarm distance, decelerating the vehicle by controlling said electromagnetic clutch prior to said running control means in case the velocity of the vehicle with respect to the preceding vehicle exceeds a predetermined value.

7. The speed control system as defined in claim 6 wherein said means for setting an alarm distance sets the alarm distance x3(m) to the value determined by the equation:

$$x3(m) = 2 \cdot Vi(m/s) + 24$$

where Vi(m/s) is the velocity.

8. The speed control system as defined in claim 1 wherein said distance control means includes means for setting an inhibit distance shorter than the proper distance, and said distance control means neglects any measured distance below the inhibit distance.

9. The speed control system as defined in claim 8 wherein said means for setting an inhibit distance sets the inhibit distance a(m) to either smaller one of the values $a_1(m)$ and $a_2(m)$ determined by the equations:

$$a1(m) = 0.5 \cdot Vi(m/s) \text{ and } a2(m) = 5$$

where Vi(m/s) is the velocity.

10. A speed control apparatus for a motor vehicle, comprising:
    means for measuring a speed of the vehicle;
    means for setting a first speed as a desired speed of the vehicle;
    means for detecting a preceding vehicle, and measuring a distance to said preceding vehicle;
    means for determining a proper distance to said preceding vehicle based on said measured speed, and determining a proximate distance to said preceding vehicle which is less than said proper distance;

means for determining said vehicle approaching said preceding vehicle by a change in said measured distance decreasing greater than a predetermined rate; and control means, for:
  (1) maintaining the speed of said vehicle at said desired speed;
  (2) reducing said desired speed from said first speed to a second speed slower than said first speed when said vehicle approaching said preceding vehicle is detected for a predetermined time interval, and increasing said desired speed to a value above said second speed once said vehicle approaching said preceding vehicle is no longer detected for said time interval;
  (3) maintaining said desired speed constant at any of said first speed, said second speed or said value above said second speed, when the measured distance is between the proper distance and the proximate distance; and
  (4) rapidly decelerating the vehicle when said measured distance is below the proximate distance.

11. A method of speed control for a motor vehicle, comprising the steps of measuring a speed of the vehicle;

setting a first speed as a desired speed of the vehicle;

detecting a preceding vehicle, and measuring a distance to said preceding vehicle;

determining a proper distance to said preceding vehicle based on said measured speed, and determining a proximate distance to said preceding vehicle less than said proper distance;

determining said vehicle approaching said preceding vehicle by a change in said measured distance decreasing greater than a predetermined rate;

normally maintaining the speed of said vehicle at said desired speed;

reducing said desired speed from said first speed to a second speed when said vehicle approaching said preceding vehicle is detected for a predetermined time interval, and increasing said desired speed once said vehicle approaching said preceding vehicle is no longer determined for said time interval;

maintaining said desired speed constant at said first speed or said second speed when the measured distance is between the proper distance and the proximate distance; and rapidly decelerating the vehicle when said measured distance is below said proximate distance.

* * * * *